Figure 1:
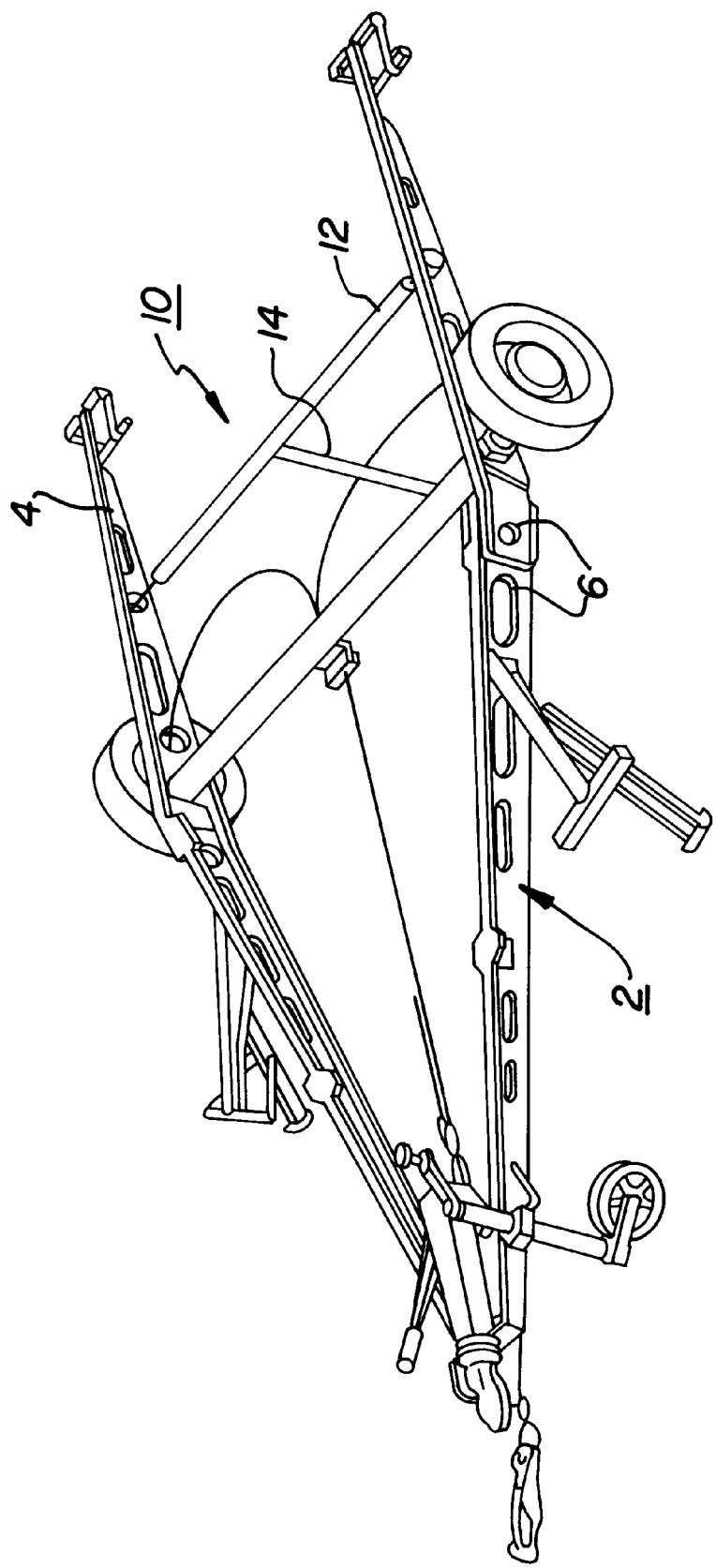

United States Patent [19]
West

[11] Patent Number: 5,899,101
[45] Date of Patent: May 4, 1999

[54] SECURITY DEVICE FOR A CHASSIS OR FRAME

[76] Inventor: John T. West, "Grasmere", 17 Village Way, Kirby Cross, Nr. Frinton-on-Sea, Essex, United Kingdom, CO13 0PE

[21] Appl. No.: 08/256,925

[22] PCT Filed: Jan. 29, 1993

[86] PCT No.: PCT/GB93/00200

§ 371 Date: Sep. 29, 1994

§ 102(e) Date: Sep. 29, 1994

[87] PCT Pub. No.: WO93/14955

PCT Pub. Date: Aug. 5, 1993

[30] Foreign Application Priority Data

Jan. 31, 1992 [GB] United Kingdom ................... 9202102

[51] Int. Cl.$^6$ ...................................................... E05B 65/12
[52] U.S. Cl. ................................ 70/238; 70/237; 70/235; 70/226; 70/62
[58] Field of Search ............................. 70/226, 234, 235, 70/237, 62; 109/50–52; 248/552, 507, 508, 499; 211/4, 5, 17–24

[56] References Cited

U.S. PATENT DOCUMENTS

| 758,114 | 4/1904 | Shertzer ................................. 248/508 |
| 1,351,297 | 8/1920 | McCracken . |
| 3,065,947 | 11/1962 | Thompson ............................... 248/508 |
| 3,170,663 | 2/1965 | Fite ..................................... 248/508 X |
| 3,739,609 | 6/1973 | Kaufmann ................................ 70/234 |
| 3,802,232 | 4/1974 | Mattson et al. ........................... 70/234 |
| 3,994,079 | 11/1976 | Boslough .................................... 211/5 |
| 4,110,940 | 9/1978 | Vanderlyn ................................... 52/23 |
| 4,164,907 | 8/1979 | Piatscheck et al. ....................... 109/50 |
| 4,664,041 | 5/1987 | Wood ...................................... 109/51 |
| 4,807,453 | 2/1989 | Bernier et al. ....................... 70/234 X |
| 5,199,361 | 4/1993 | Robinson ................................. 109/51 |

FOREIGN PATENT DOCUMENTS

| 72663/87 | 11/1987 | Australia . |
| 47915/90 | 1/1990 | Australia . |
| 60-121150 | 6/1985 | Japan . |
| 798426 | 7/1958 | United Kingdom . |

*Primary Examiner*—Steven N. Meyers
*Assistant Examiner*—Tuyet-Phuong Pham
*Attorney, Agent, or Firm*—Cushman, Darby & Cushman IP Group of Pillsbury Madison & Sutro LLP

[57] ABSTRACT

A security device (10) for security a frame or chassis of a caravan or other wheeled vehicle to the ground comprises an elongate securing arm (12) extending substantially transversely of the chassis between two frame members (4) thereof, and an elongate support member (14) extending downwardly into the ground. The support member (14) and the securing arm (12) are made in one piece and the free end of the support member (14) is engaged in the ground. The engagement of the support member (14) is such that withdrawal thereof from the ground requires rotation of the support member (14). At each of its ends, the securing arm (12) carries engagement members (32,34) to engage with, and be locked to, the frame members (4). Although the security device is simple to manufacture and install, it provides a high degree of security.

23 Claims, 4 Drawing Sheets

FIG. I

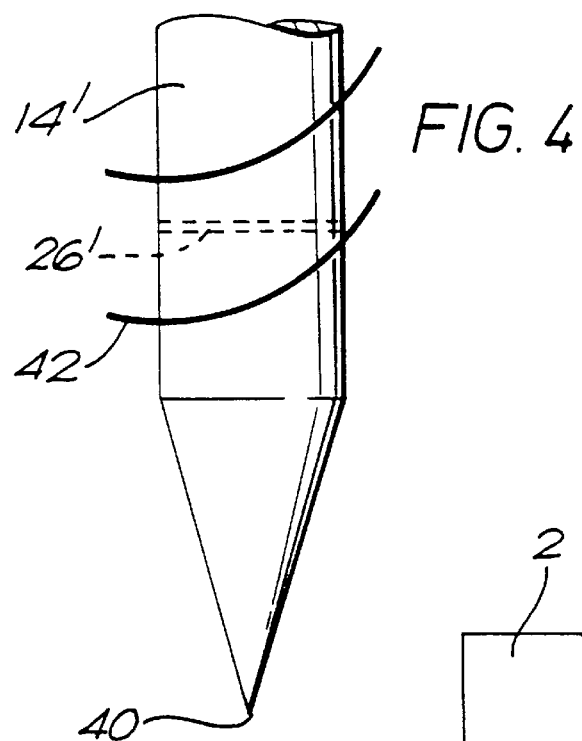
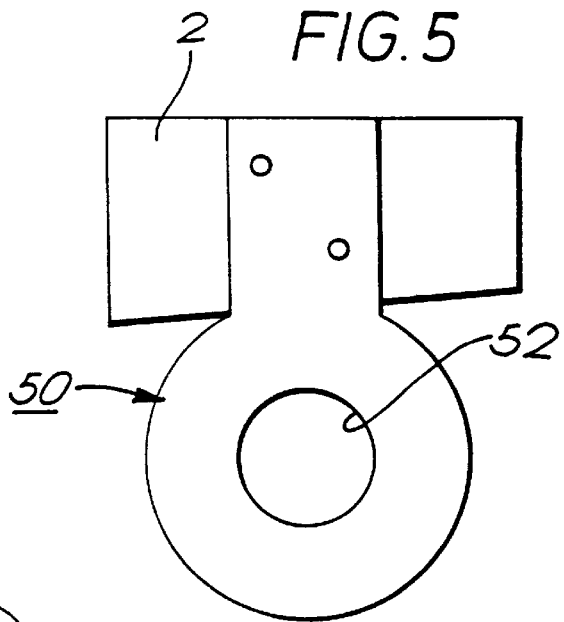
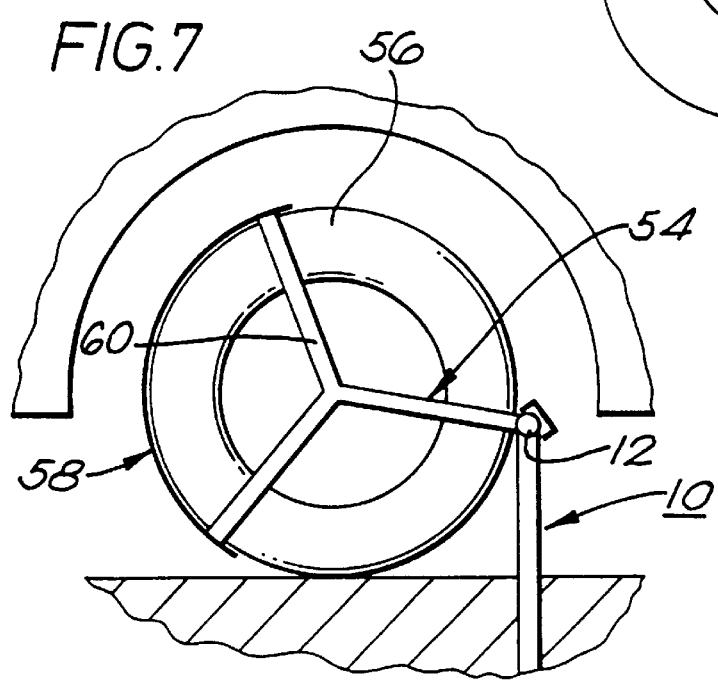

SECURITY DEVICE FOR A CHASSIS OR FRAME

The present invention relates to a security device for a chassis or frame, particularly for securing a chassis or frame to the ground.

Whilst the security device can be used in any circumstances where it is required to secure a vehicle, machine or the like, the invention is particularly concerned with the security of caravans or other wheeled vehicles which are to be stood in one place for some considerable time. In this respect, the theft of caravans, power boats, horse trailers, and construction plant and equipment has become increasingly common.

It is an object of the invention to provide a security device for a chassis or frame which is simple to install, but gives a high degree of security.

According to the present invention there is provided a releasable security device for securing a chassis or frame to the ground, said security device comprising a support member for engagement in the ground, at least one securing member for engagement with said chassis or frame, and locking means for releasably locking said securing member in engagement with said chassis or frame, wherein said support member and said securing member are rigidly connected whereby said chassis or frame can be secured to the ground.

It is particularly advantageous to secure the chassis or frame of a wheeled vehicle, such as a caravan or a boat trailer, to the ground, rather than securing or immobilising an individual part of the vehicle to be protected. In this respect, it will be appreciated that the chassis or frame is inherently strong and not easily movable. Securing the chassis or frame to the ground enables the provision of a particularly strong and secure device in a relatively simple manner.

The support member may, if required, be permanently fixed within the ground. For example, the support member may be an upstanding metal tube or rod, embedded in concrete or another foundation in the ground. The securing member may, similarly, be permanently fixed to the support member, or may be arranged to be connected thereto. For example, the upstanding end of the support member may be provided with a screw thread for the connection thereto of a correspondingly screw threaded securing member.

Presently, it is preferred that the support member is arranged to be removably engaged in the ground. In this respect, the rigid connection between the support member and said securing member, and the locking means for engaging the securing member on the chassis or frame, are arranged such that, in the secured position of the security device, the securing member opposes any withdrawal motion of the support member.

Thus, the support member may be a spike, of metal or other material, arranged to be hammered or otherwise pushed into the ground to at least a predetermined depth. At its upstanding end, the support member is rigidly connected to a substantially horizontally extending securing member, and said securing member is fixed to the chassis at a point substantially in alignment with the extent of the securing member. It will be appreciated that, in this position, withdrawal of the spike from the ground is only possible by lifting the chassis, to which the securing member is attached.

Although an arrangement with the support member formed as a simple spike is reasonably secure, particularly where the chassis or frame supports a heavy vehicle such as a caravan, the device can be made even more secure, and easier to use, by requiring the support member to be rotated during its insertion into, and subsequent withdrawal from, the ground.

In an embodiment, a support member comprises an elongate member having a pointed end and having one or more auger flights provided on its periphery. The elongate member may be solid or hollow.

It will be appreciated that the auger flights require the support member to be screwed or rotated to be advanced into the ground, and that withdrawal of the support member similarly requires an opposing rotation.

In an alternative embodiment, a receiving means for fixing in the ground is provided for said support member. For example, said receiving means may comprise a tubular member for fixing in the ground and arranged to receive at least an end portion of said support member. Interengaging means may be provided on the receiving member and on said support member to releasably engage the support member within said receiving member. Any suitable interengaging means may be provided, but it is preferred that interengagement should require rotation of the support member relative to the receiving member.

In an embodiment, said support member is a hollow or solid elongate member, such as a tube or rod, whose end portion is arranged to be received within a tubular receiving member. The interengaging means comprise a pin or bar extending diametrically of, and within, said receiving member, and at least one slot extending in said support member and opening in the end thereof. The or each said slot is shaped to require rotation of said support member to accommodate said pin or bar as the support member is inserted or withdrawn. The slot may be of any suitable shape, for example, it may be part helical. However, in a preferred embodiment, the slot is cranked, having a first portion extending from the end of the support member substantially longitudinally thereof, and communicating with a second portion extending substantially transversely.

In a preferred embodiment, said securing member comprises an elongate arm arranged to extend substantially at right angles to said support member. Preferably, the securing arm projects on either side of said support member such that the security device is generally T-shaped. The arm may be fastened to the support member in any appropriate manner. However, in a particularly preferred embodiment, the support member and said elongate securing arm are formed in one piece. For example, the support member and the arm may be lengths of metal tubing welded together substantially centrally of said arm to form the T-shaped security device.

Engagement means may be provided at or near the or each end of said securing member for engagement with said chassis or frame. Any suitable engagement means may be provided, for example, the or each free end of the securing member may be provided with releasable clamping members, gripping members, jaws or the like. The locking means are then be arranged to releasably lock said clamping members or jaws in their closed position.

In a preferred embodiment, said engagement means at the free end or ends of said securing member comprises a projecting portion, to extend through part of the chassis or frame, and two spaced engaging members carried on said projecting portion, said engaging means being arrangeable on either side of said part of the frame or chassis. Preferably, said engaging members are washers, and at least one of said washers is annular and is movable along said projecting portion. In this manner, one washer may be positioned in abutment with a respective side of said part, such that said two washers grip or clamp said part of the chassis or frame.

The locking means may be arranged to lock one or each of said washers in its position in abutment with said part of the chassis or frame.

Additionally and/or alternatively, two opposed brackets may be arranged to be secured to the chassis or frame. Each bracket has a hole extending therethrough, and the holes of the two brackets are aligned to define a bore through which said projecting portion can extend. This arrangement is particularly useful where it is not convenient or possible for the projecting portion to extend through the chassis.

In a preferred embodiment, said security member is an elongate securing arm arranged to extend substantially at right angles to said support member and to project on either side thereof, and the two ends of said securing arm are hollow and are each arranged to receive an end of a respective projecting portion therein.

Each said projecting portion may comprise an elongate extension tube arranged to be received within a respective open end of said securing arm, and said engagement means being carried on said projecting portion.

In an embodiment, each said elongate extension tube is rotatable relative to said securing arm, and each said extension tube is cranked along its length such that the location of an end of said extension tube relative to said end of said securing arm is adjustable. In this manner, the height of each extension tube above the ground can be adjusted whereby the security device is usable to secure chassis or frames having different heights above the ground.

In an embodiment, the security device further comprises two spaced wheel engaging members connected to said securing arm, each said wheel engaging member comprising an elongate support connected at one end to said securing arm and carrying a curved plate at the other end thereof. Each said curved plate is positioned in engagement with a respective wheel of the chassis to prevent rotation or steering movements of said wheel.

Preferably, said one end of each said elongate support is connected to or formed with a respective one of said projecting portions.

To ensure that the security device is useful with all different types and sizes of chassis or frame, it is useful if the length of the securing member is adjustable. This may be achieved, for example, by forming the securing member in two parts, namely a first elongate tubular part connected to said support member, and one or more elongate arms receivable within and slidable with respect to said tubular part. The free end of the or each said arm may define said projecting portion for extending through said part of the chassis or frame or through the brackets provided. Means may be provided to lock the or each arm relative to the tubular portion once the locking position has been determined.

Figure 2:
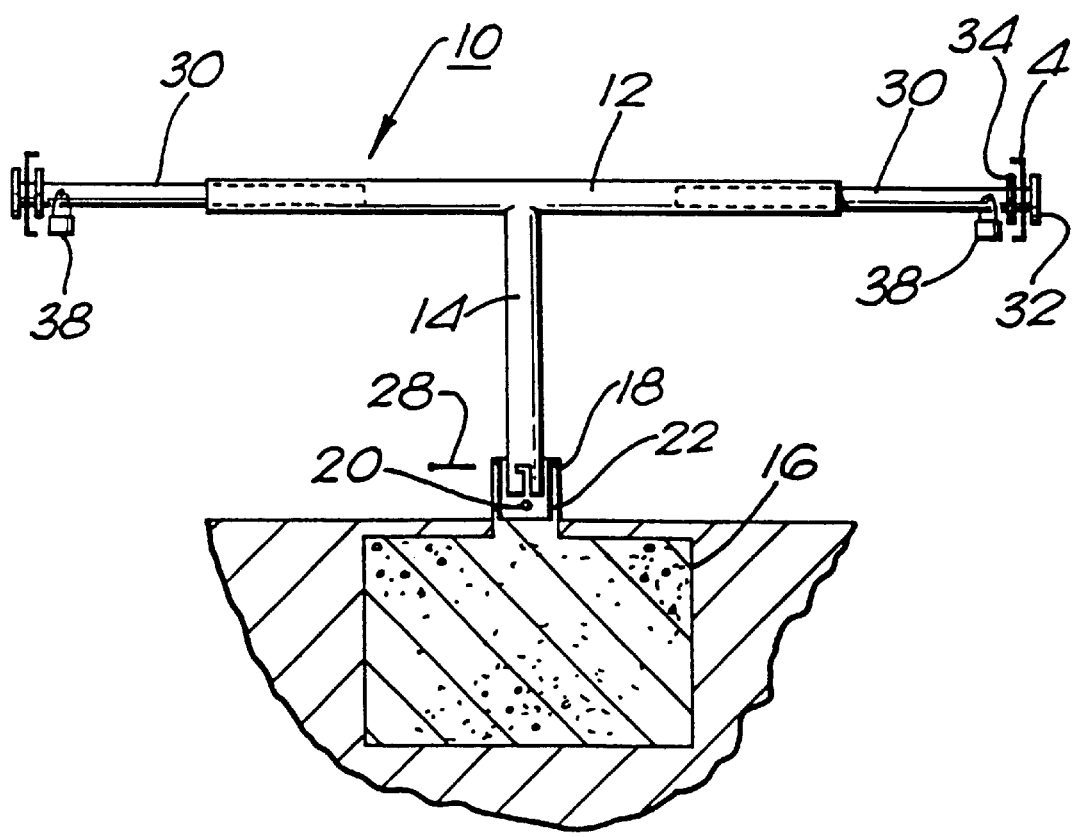
Figure 3:
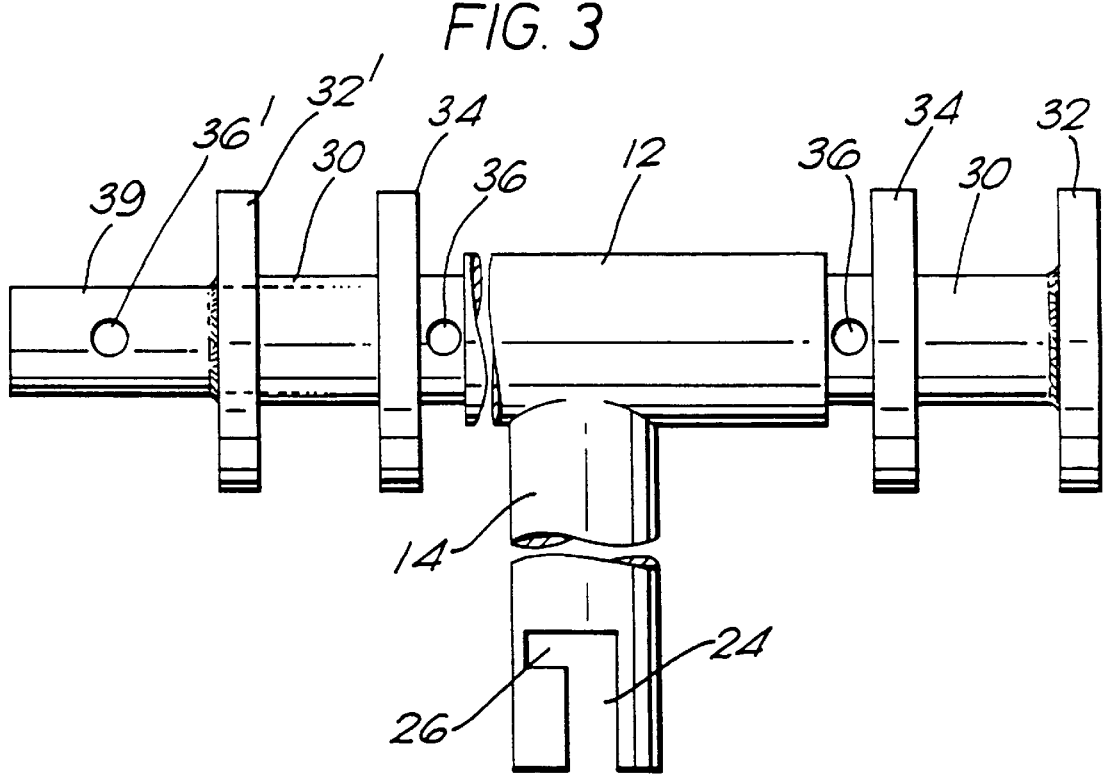
Figure 6:
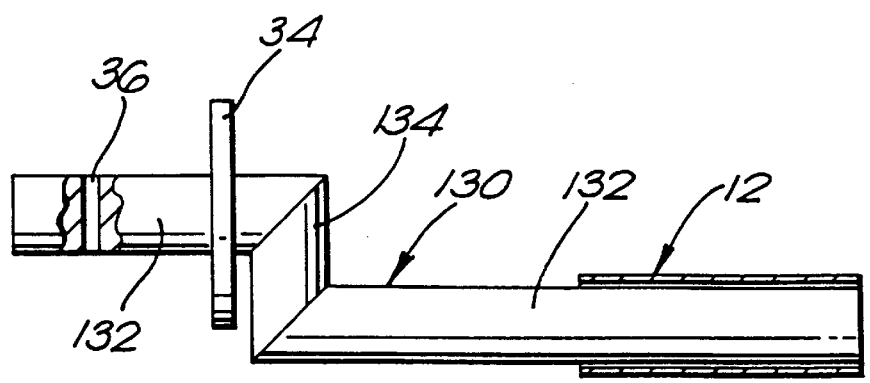

Embodiments of the present invention will hereinafter be described, by way of example, with reference to the accompanying drawings, in which:

FIG. 1 shows a perspective view of a chassis for a caravan with a security device of the present invention affixed thereto, FIG. 2 shows a side elevation, partly in section of the security device of FIG. 1, FIG. 3 shows details of two alternative embodiments of the security device of FIG. 2 on an enlarged scale, FIG. 4 shows the base of an alternative support member of a security device of the invention, FIG. 5 shows a hanging bracket for use with a security device of the invention, FIG. 6 shows a detail of an alternative embodiment of the security device enabling height adjustment, and FIG. 7 shows a side view of an alternative embodiment of a security device of the invention for fitting onto a wheel.

The security device illustrated herein may be used to secure a caravan, other wheeled vehicles, or any machine or article having a chassis or frame. In this respect, in the description below it is the security of a caravan only which is described, but it will be appreciated that the present invention is not limited to such an application.

Caravans have, increasingly, become targets for thieves. The caravan may simply be hitched to the back of a driven vehicle and then driven away. In many cases, the caravan may have connected services, but these can be disconnected or severed relatively easily.

Generally, wheeled vehicles, for example, can be secured by immobilising part of the vehicle. For example, cars are frequently secured by clamping a wheel thereof, or by connecting the steering wheel thereof to its clutch. However, such arrangements do not render the vehicle entirely secure as they do not prevent the vehicle being placed on a trailer, for example, and being towed away. The present invention by contrast, secures the caravan or other vehicle to the ground and therefore, in a simple manner, provides an extremely secure and reliable security device.

FIG. 1 indicates one embodiment of a security device of the invention in position to secure a caravan. In this respect, FIG. 1 shows a perspective view of a chassis 2 of the caravan. It will be appreciated that the caravan is supported on, and connected to, the chassis 2, but the caravan has been omitted for clarity. It will be appreciated that differently shaped chassis are available but it is common for the chassis to comprise at least two, spaced longitudinally extending members 4, and it is also common for the frame members 4 to be provided with holes or apertures, as 6, therein. A security device of the invention is indicated generally at 10 in FIG. 1 and, as can be seen therein, includes an elongate securing arm 12 extending substantially transversely of the chassis between the two frame members 4, and an elongate support member 14 extending downwardly into the ground. It will immediately be apparent that as each end of the arm 12 is fastened to a respective frame member 4, and that as the support member 14 extends into the ground the chassis will be secured to the ground. It will also be apparent that removing the chassis 2, and hence the caravan supported thereon, from the ground will be difficult. In the simplest case, the support member 14 may comprise a simple elongate spike which has been hammered into the ground. In this situation, the caravan will be secure against all attempts to move it unless the caravan and its attached chassis are physically lifted substantially vertically. Even this manner of stealing the caravan can be avoided if the support member 14 is arranged such that it has to be rotated to enable its withdrawal.

FIGS. 2 and 3 show the construction of one embodiment of the security device 10. In this respect, in the illustrated embodiment, the security device 10 is formed such that the support member 14 and the securing arm are in one piece. The arm 12 and the support member 1 are each made of a metal tube, which has been case hardened, and one end of the support member 14 extends into and has been welded to the arm 12 substantially centrally of its length to form the T-shaped security device 10. The connection between the arm 12 and the support 14 is rigid.

As can be seen in FIG. 2, the free end of the support 14 is engaged with and fastened to a concrete block 16 in the ground. In this respect, the concrete block 16 formed in the ground is provided with an upstanding portion 18 arranged to form receiving means for the end of the support 14. In the embodiment shown, the receiving means comprises a length of metal tubing 22 secured within a bore of the upstanding concrete portion 18. The bore of the portion 18 and the tubing 22 extend coaxially, and the tubing 22 may have a closed base as shown. Extending within, and fixed to the tubing 22, is a diametrically extending bar 20 for interengaging with associated means on said support 14.

As can be more clearly seen in FIG. 3, at its free end, the tubular support 14 is provided with two diametrically aligned slots 24. Each slot 24 extends from the end of the support 14 longitudinally and then communicates with a circumferentially extending cutout 26. The slots 24 and the bar 20 are arranged to interengage. Thus, on inserting the free end of the support 14 into the tubing 22, the bar 20 can be positioned to be received within the slots 24 and thereby to enable further downward movement of the support 14 into the tubing 22. During this movement the bar 20 moves along the longitudinal portion of the slots 24 and into the cutouts 26. Rotation of the support 14 then moves the bar 20 along each cutout 26, circumferentially of the support 14. In this position movement of the support 14 out of the tubing 22 is prevented. It is possible to lock the support 14 relative to the tubing 22 in this position, for example, to prevent rotation of the support 14 relative to the tubing 22. In this respect, the tubing 22 and the concrete portion 18 are provided with aligned bores (not shown) to enable the insertion of a locking pin 28 to extend through the portion 18, the tubing 22 and the slots 24 of the support 14.

In use, the security device 10 is generally fixed to the concrete base 16 in the ground as indicated above. Obviously, the concrete block 16 needs to be positioned in the ground in a suitable position relative to the caravan to be secured, but with a caravan park for example, where each caravan has a predetermined location, this does not present a problem. Once the security device 10 has been secured to the ground, it is then necessary to ensure its connection to the chassis 2. It would be possible to connect the arm 12 to the chassis 2 at one position only, but it is preferred that each end of the arm 12 should be secured thereto as indicated in FIG. 1.

At each of its ends, a smaller diameter extension arm or tube 30 is inserted into the tubular arm 12 to form projecting portions. Each tube 30 is preferably of metal which has been case hardened. In the embodiment illustrated at the right hand of FIG. 3, an end stop 32 is welded onto the projecting end of each extension tube 30. Each tube 30 is also arranged to carry an annular washer 34 which is movable along the tube 30. In use, the end of each tube 30 opposite to that carrying the end stop 32 is inserted through an appropriate hole 6 in the frame member 4, through the washer 34, and then into a respective end of the tubular arm 12. The position of the two tubes 30 relative to the arm 12 is adjusted such that the securing arm comprised of the arm 12 and its projecting portions formed by tubes 30 is the correct length to span the two frame members 4. Each movable washer 34 is then adjusted to abut the respective frame member 4 and to grip part of the frame member in conjunction with its associated end stop 32. It is then only necessary to secure each washer 34 so that it can no longer move relative to the respective tube 30 to complete the securing of the caravan to the ground. In this respect, it will be appreciated that if each washer 34 is prevented from moving relative to its tube 30, that tube 30 cannot be pulled out of the arm 12, and thus the arm 12 remains locked to the chassis 2.

In the embodiment shown in FIGS. 1 and 2, the tube 30 is provided with a number of bores 36 therethrough and a locking pin can be positioned to extend through an appropriate one of the locking bores 36 to lock the security device. In the particular embodiment shown, each locking pin is the hank of a respective padlock 38. It will be appreciated that a plurality of bores 36 are preferably provided through each tube 30 so that the spacing between the end stop 32 and the movable washer 34 can be chosen as required.

The left hand of FIG. 3 shows an alternative embodiment in which the locking means comprise a fixed washer 32' which is welded onto an extension piece of tubing 39 arranged either to receive a respective arm 30 therein, or to slide within that arm 30. In this respect, the relative movement of the extension piece 39 and the arm 30 enables the fixed washer 32' to be moved relative to the movable washer 34 carried by the arm 30. Bores 36 and 36' are provided in the arm 30 and in the extension piece 39 so that the movable washer 34 can be locked relative to the arm 30, and so that the extension piece 39 can similarly be locked relative to the arm 30.

FIG. 4 shows part of the ground engaging free end of an alternative support member 14' for use, for example, where it is not required to provide a concrete block but where something more secure than simply hammering the support into the ground is required. In this respect, it will be seen that the free end of the support 14' is tapered to a point 40 to enhance the insertion of the support 14' into the ground. Furthermore, auger flights 42 are fixed to the external periphery of the support 14'. These auger flights 42 are positioned and shaped such that rotation of the support 14' in a selected direction causes the progression of the support 14' into the ground. Similarly, rotation of the support 14' in the opposite direction causes withdrawal of the support 14' from the ground. Of course, once the security device is secured both in the ground and to the chassis 2, such rotation will not be possible.

In the embodiment illustrated in FIG. 4, the support 14' is also provided with a through bore 26' for the receipt of a locking pin 28 if required. Thus, the support 14' can be used with a concrete block as 16, or otherwise is interchangeable with the embodiment show in FIGS. 1 to 3, if required.

The chassis 2 shown in FIG. 1 is provided with apertures 6 which facilitate the engagement of the security device thereto. However, such is not always the case, and FIG. 5 illustrates an alternative embodiment for use where it is not possible or not required to engage the security device by way of holes in the chassis 2. In this embodiment, two brackets as 50 are bolted to the chassis 2 such that they are spaced apart. A central hole 52 extends through part of each bracket 50, and the holes 52 are aligned to define a bore through which the end of a respective arm 30 may extend. The arm 12 may then be secured to the chassis 2 by securing the arms 30 to the brackets 50.

FIG. 6 shows an alternative embodiment of a security device which is adjustable in height and hence enables a single security device of one size to be used to secure chassis of varying heights above the ground. In the embodiment shown in FIG. 6, a projecting portion in the form of an arm or tube 130 is received within the hollow end of the securing arm 12 and is rotatable therein. Each arm 130 is cranked to define two arm portions 132 which extend substantially parallel with respect to one another but are spaced and joined by a crank portion 134. As in the previous embodiments, the outer arm portion 132 carries a moveable annular washer 34 and has one or more bores 36 therethrough. The outer arm portion 132 may also be provided with a fixed washer as 32, or be arranged to receive an extension piece 39.

The arm 130 can be rotated within the securing arm 12 and such rotation may be used to move the outer arm portion 132 from a position above the inner arm portion 132 to a position below the inner arm portion. It will be appreciated that such rotation enables the height above the ground of the connection formed by the washer 34 and the corresponding washer 32 or 32' to be varied over a distance which is substantially twice the length of the cranked portion 134.

FIG. 7 shows a side view of a further embodiment of security device of the invention which may, additionally and/or alternatively, be engaged with wheels 56 of the frame or chassis. In the embodiment shown in FIG. 7, the securing arm 12 of the security device 10 carries two wheel engaging members, in the form of cradles, generally indicated at 54, each for engagement with a respective wheel 56 of the chassis to be secured. Each cradle 54 comprises a bifurcated bar 60 supporting a curved plate 58 at one end thereof. The plate 58 is curved to extend along part of the circumference of the wheel 56 and preferably extends over the axial extent thereof. The other end of each bifurcated bar 60 is engaged in a respective end of the securing arm 12 in a similar manner to the tubes or arms 30 as described above. It will be appreciated that the curved plate 58 prevents rotational movement of the wheel 56. Sideways or steering movements of the wheels 56 are prevented by the two bars 60 of the two cradles 54. In this respect, the two bars 60 are relatively spaced and extend substantially parallel to one another.

In the embodiment illustrated in FIG. 7, the security device 10 is locked to the wheels 56 and hence to the chassis of which the wheels 56 are a part. However, it is also possible to provide for the security device 10 to be locked to the frame of the chassis as in the previous embodiments, with the securing means for locking onto the wheels being provided additionally.

In the embodiments described above, particular means have been described for engaging the support member 14, 14' in the ground, and for locking the arm 12 to the chassis. However, it will be immediately appreciated that any alternative means may be utilised. However, for most practical purposes it is necessary that both the support member and the securing arm should be releasable.

The security device may be made of any suitable material. However, the use of case hardened metal is particularly preferred as such material cannot be cut with a hacksaw, but requires a disc cutter or similar device.

Whatever the material or materials from which the security device is made, it would generally be the case that if thieves try to remove the device by cutting or burning or the like, vibration and/or smoke will be generated. Accordingly, a vibration detector, a smoke detector and/or other anti-tamper device may be incorporated into the security device and arranged to set off an alarm if tampering is detected thereby.

It will be appreciated that other variations and modifications may be made to the embodiments as described above within the scope of the present application.

I claim:

1. A releasable security device for securing a chassis or frame to the ground, said security device comprising:

an upstanding, elongate support member having first and second spaced ends, the first end of said support member being a free end constructed and arranged for being secured to the ground;

an elongate securing arm rigidly connected to said second end of said support member, said securing arm having a longitudinal axis and first and second spaced longitudinal ends, said securing arm extending substantially at right angles to said support member and projecting on either side of said support member so as to define a generally T-shape;

first and second engagement means, constructed and arranged for being engaged with a chassis or frame, a respective one of said first and second engagement means being provided adjacent each of said first and second ends of said securing arm, wherein each of said first and second engagement means comprises a rigid projecting portion projecting in an axial direction, generally axially from the respective longitudinal end of said securing arm, and first and second spaced engaging members carried on said projecting portion and constructed and arranged for being engaged on either side of part of a frame or chassis, at least one of said engaging members being selectively axially displaceable along said axial direction relative to the other of said engaging members; and first and second locking means, a respective one of said first and second locking means releasably locking each of said first and second engagement means, so as to limit said relative axial displacement of said one of said engaging members relative to the other.

2. A security device according to claim 1, wherein said first, free end of said support member is adapted to be permanently fixed within the ground.

3. A security device according to claim 2, wherein said support member is an upstanding metal tube, and said first end thereof is embedded in a foundation adapted to be on the ground.

4. A security device according to claim 2, wherein said support member is an upstanding rod, and said first end thereof is embedded in a foundation adapted to be on the ground.

5. A security device according to claim 1, wherein said first, free end of said support member is adapted to be releasably secured to the ground, and wherein the support member is arranged such that it has to be rotated during its insertion into, and during its subsequent withdrawal from, the ground.

6. A security device according to claim 5 wherein said free end of the support member is pointed and has at least one auger flights provided on its periphery.

7. A security device according to claims 5, further comprising a receiving member adapted to be fixed in the ground, the receiving member receiving said first end of said support member, and interengaging means provided on the receiving member and on said support member to releasably engage the support member within said receiving member.

8. A security device according to claim 7, wherein said receiving member comprises a tubular member adapted to be fixed in the ground, and wherein said interengaging means require rotation of the support member relative to the receiving member.

9. A security device according to claim 7 wherein said receiving member is tubular, and said first end of said support member is received within said tubular receiving member, and wherein said interengaging means comprise a pin extending diametrically of, and within, said receiving member, and at least one slot extending in said support member and opening in the first end thereof.

10. A security device according to claim 9, wherein said slot is cranked, said slot having a first portion which extends from the first end of the support member substantially longitudinally thereof and a second portion which extends substantially transversely, said first and second portions of said slot being in communication.

11. A security device according to claim 1, wherein said second end of the support member is provided with a screw thread, and wherein said elongate securing arm is provided with a corresponding screw thread, said securing arm being screw threadingly connected to said support member.

12. A security device according to claim 1, wherein said elongate security arm is permanently fixed to said support member.

13. A security device according to claim 12, wherein the support member and said elongate securing arm are formed in one piece.

14. A security device according to claim 1, wherein each of said first and second engaging members is a washer, and wherein at least one of said washers is annular and is movable along said projecting portion, and wherein a respective one of said first and second locking means is arranged to lock at least one of said washers in position.

15. A security device according to claim 1, wherein each of said first and second engaging means further comprises two opposed brackets arranged to be secured to the chassis or frame, each said bracket having a hole extending therethrough, the holes of the two brackets being aligned to define a bore through which said projecting portion extends.

16. A security device according to claim 1, wherein each of said first and second ends of said securing arm is hollow and is arranged to receive a respective projecting portion therein.

17. A security device according to claim 16, wherein each said projecting portion comprises an elongate extension tube arranged to be received within a respective one of said first and second ends of said securing arm, and wherein a respective one of said first and second engagement means is carried on the corresponding projecting portion.

18. A security device according to claims 17, wherein each said elongate extension tube is rotatable relative to said securing arm, and each said extension tube is cranked along its length such that the location of an end of said extension tube relative to said end of said securing arm is adjustable.

19. A security device according to claim 16, further comprising two spaced wheel engaging members connected to said securing arm, each said wheel engaging member comprising an elongate support having first and second spaced ends, the first end of said elongate support being connected to said securing arm, and the second end of said elongate support carrying a curved plate.

20. A security device according to claim 19, wherein said first end of each said elongate support is connected to a respective one of said projecting portions.

21. A security device according to claim 19, wherein said first end of each said elongate support is formed with a respective one of said projecting portions.

22. A security device according to claim 1, wherein the length of said elongate securing arm is adjustable.

23. A security device according to claim 22, wherein said elongate securing arm is formed of a plurality of parts comprising a first elongate tubular part connected to said support member, and at least one elongate arms receivable within and slidable with respect to said tubular part.

* * * * *